June 26, 1951 P. M. G. TOULON 2,558,019

SIGNAL DISTRIBUTING SYSTEM FOR TELEVISION RECEIVER TUBE HAVING EQUAL NUMBER OF PICTURE ELEMENTS AND CATHODE-RAYS

Filed April 2, 1947 3 Sheets-Sheet 1

INVENTOR
PIERRE MARIE GABRIEL TOULON
BY
Toulmin & Toulmin
ATTORNEYS

INVENTOR
PIERRE MARIE GABRIEL TOULON
BY
Toulmin & Toulmin
ATTORNEYS

June 26, 1951

P. M. G. TOULON 2,558,019

SIGNAL DISTRIBUTING SYSTEM FOR TELEVISION RECEIVER TUBE HAVING EQUAL NUMBER OF PICTURE ELEMENTS AND CATHODE-RAYS

Filed April 2, 1947

3 Sheets-Sheet 3

INVENTOR
PIERRE MARIE GABRIEL TOULON
BY Toulmin & Toulmin
ATTORNEYS

Patented June 26, 1951 2,558,019

UNITED STATES PATENT OFFICE 2,558,019

SIGNAL DISTRIBUTING SYSTEM FOR TELEVISION RECEIVER TUBE HAVING EQUAL NUMBER OF PICTURE ELEMENTS AND CATHODE RAYS

Pierre Marie Gabriel Toulon, Neuilly-sur-Seine, France, assignor to Products & Licensing Corporation, New York, N. Y., a corporation of Delaware Application April 2, 1947, Serial No. 739,018
In France February 2, 1939

Section 1, Public Law 690, August 8, 1946
Patent expires February 2, 1959

17 Claims. (Cl. 178—7.3)

The present invention relates to devices for distributing to a plurality of conductors successive signals (for instance television signals or multiplex telephonic currents) supplied from a single channel.

It relates also to image reproducing tubes for use with such signal distributing devices.

At the present time, the most commonly used television receiving apparatus is the electron beam tube.

In order to receive television pictures with such an apparatus, two methods are possible, to wit either to make use of a small tube giving a highly luminous image which is magnified by projection on a screen or to employ a large size tube the rear face of which is directly observed. The first solution makes it necessary, in order to obtain an image sufficiently luminous for permitting projection onto a screen, to feed very high voltages to this tube, which consequently reduces the life thereof. High voltage supply is costly and dangerous. The projection lens system, which must be of large diameter, is heavy and expensive. The projection plant is cumbersome. And finally the projected image is little luminous. As for the second solution, it can give but relatively small images and even for such images the tube is heavy and cumbersome and involves risks of explosion.

An object of my invention is to avoid these drawbacks.

With my invention, the tube is reduced to a small thickness because there is no longer any need of scanning by means of an electron beam as it was the case up to now. The signals that are received are continuously distributed in a static fashion. According to my invention, I make use, on the surface of a cathode, of a multiplicity of electron fluxes which are distinct but fixed in space and are successively produced and simultaneously modulated by the signals. Electron emission is controlled by means of a static distributor.

This tube may be made of very large area and therefore give large images while requiring but little space for the static distribution. On the other hand, every point of the sufrace undergoes modulation for a substantial time, whereby a very luminous image can be obtained without making use of very high voltages.

Preferred embodiments of my invention will be hereinafter described with reference to the accompanying drawings, given merely by way of example, and in which.

Figure 1:
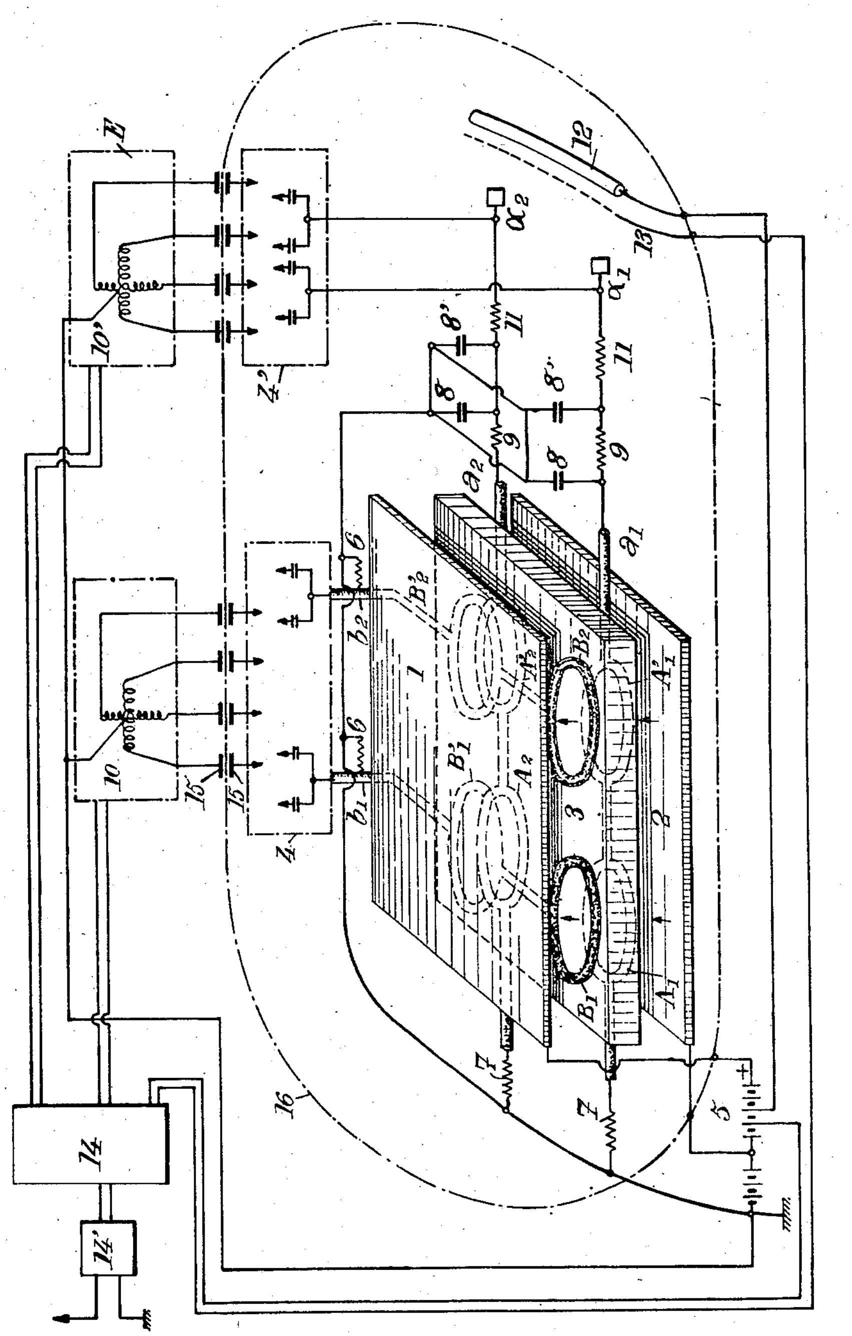
Fig. 1 is a general view of a system according to my invention.

For the sake of simplicity, in Fig. 1, it has been supposed that the image or frame includes only two lines, having each two light spots and the screen and modulation means are shown in perspective view. Such a highly diagrammatic showing is of course greatly different from practical conditions, where the screen will generally include about 400 lines including each some 500 light spots, so that the area will be very large and the modulation elements (the number of which is four as shown by the drawing) are in fact some 200,000 in number. Every point of the fluorescent screen 1 can receive an electron flux from a plane cathode 2 locally controlled by two electrodes respectively designated by A and B. These electrodes are fixed on the front and rear faces of a sheet 3 of insulating material disposed between cathode 2 and screen 1. This insulating sheet 3 is provided with a multiplicity of holes for the passage of the electronic fluxes. On Fig. 1, I have indicated the fluxes by arrows and I have shown only the edge of each of the circular holes where the electrode exerts its controlling action. The first hole of the first row is thus controlled by electrodes $A_1$ and $B_1$ and the second hole of said first row by electrodes $A'_1$ and $B_2$. The first hole of the second row is controlled by electrodes $A_2$ and $B'_1$, and the second one by electrodes $A'_2$ and $B'_2$.

Electrodes $A_1$ and $A'_1$ are connected together to constitute a conductor strip designated by $a_1$. Likewise, electrodes $A_2$ and $A'_2$ are interconnected and constitute a conductor strip designated by $a_2$. The screen is disposed in such manner that strips $a_1$, $a_2$ are vertical.

In an analogous manner, electrodes $B_1$ and $B'_1$ are interconnected and constitute a conductor strip $b_1$, and electrodes $B_2$ and $B'_2$ constitute a conductor strip $b_2$. These strips $b_1$, and $b_2$ are at right angles to the above mentioned strips $a_1$, $a_2$ and therefore horizontal.

With such an arrangement, the electron flux through every hole of plate 3 is controlled successively by the potential of a vertical strip *a* and by that of a horizontal strip *b*. Hereinafter, it will be seen that the control of the first set of strips (*a*) serves to adjust the intensity of the electron flux to a value corresponding to the luminous intensity of the respective point of the image, whereas the other control (strips *b*) has for its effect successively to select the horizontal rows of holes through which the electron fluxes are allowed to pass.

For this purpose, each strip *b* is earthed through a resistance 6 of great value which fixes its mean voltage. Each strip *b* is further connected through a system of capacitors 4 with a polyphase current distribution supplied by an oscillator 10, which controls the alternating voltage of said strip. In Fig. 1, this system of capacitors is represented by a dotted line rectangle 4. It will be hereinafter designated by the term "voltage distributor."

Electric connections between oscillator 10 and this voltage distributor 4 are preferably ensured through the glass wall of tube 16 by means of electrodes 15 applied against the opposed faces of said wall and having a high capacity with respect to each other (this arrangement avoids the necessity of too many currents extending through the glass wall). Owing to capacitors 4, every strip *b* receives an induction at the frequency of the oscillator which supplies its alternating voltage.

As it will be hereinafter described, the capacitors of distributor 4 are suitably chosen to supply each of the strips *b* with a composite alternating voltage *m* from oscillator 10 passing periodically through a very sharp maximum or peaks.

Owing to such an arrangement, I supply the respective strips *b* with alternating voltages having identical amplitudes and laws of variation, but with a given lag from each strip to the next one. The induced voltage maximum or peaks are utilized to permit the flow of electrons through the holes of the corresponding horizontal lines of the screen. For this purpose, cathode 2 is connected with the earth through a bias battery B. Through a suitable choice of the induced voltage and of the potential of this battery, I arrange so that, at any time, only one of strips *b* has a positive potential with respect to cathode 2 (or merely a potential less negative than that of cathode 2, if need be) and consequently, the electron flux from cathode 2 is stopped for all the holes with the exception of those of the row corresponding to the strip *b* the potential of which, at this time, passes through its maximum. As all the strips are caused to pass successively through this maximum of potential, the frame is vertically scanned i. e. all the horizontal lines are successively brought into play.

In order to synchronize this scanning, oscillator 10 is synchronized to the frame frequency of the television transmission by means of signals received and separated at 14 according to conventional methods.

On the other hand, means are provided for giving the respective vertical strips *a*, at any time, potentials with respect to cathode 2 the values of which correspond to the luminous intensities of the respective points of the horizontal line of the frame that is being scanned at this time, whereby the electron fluxes passing through the holes of this line reproduce the appearance of the corresponding horizontal line of the image to be transmitted. These voltages are obtained on the respective strips *a* in the following manner: each strip *a* is connected through resistances 9 and 11 (which act, together with capacitors 8 and 8' as discoupling elements) with an electrode $\alpha$ adapted to receive an electron flux from an auxiliary cathode 12 provided with a control grid 13. This electrode receives video signals from amplifier 14.

The respective electrodes $\alpha_1$, $\alpha_2$ receive, by electrostatic induction, from a distributor system 4' and an oscillator 10', alternating voltages such that each of these electrodes periodically passes through a voltage peak with a time lag between the voltage peak of one electrode and that of the next one. Voltage distributor 4' and oscillator 10' work exactly as above stated concerning voltage distributor 4 and oscillator 10, with however the difference that the frequencies are now much higher (the fundamental frequency of oscillator 10 was that of the "frames" whereas that of oscillator 10', also synchronized by signals received through 14, is that of the lines of the picture). Electrodes $\alpha$ are normally negative with respect to cathode 12 (owing to resistances 7, 9 and 11 and battery 5). But each voltage peak makes them temporarily positive. During this very short time period, the number of electrons received by each electrode $\alpha$ depends upon the potential of control grid 13 at this time. Thus each of these electrodes $\alpha$ retains a charge that corresponds to the voltage impressed upon grid 13 (which receives the video signals) when said electrode passes through its voltage peak. This charge, flowing slowly through resistances 11, 9 and 7, produces in resistance 7 a voltage drop which modifies the potential of the strip *a* with which the electrode $\alpha$ in question is connected. This arrangement thus constitutes a static "distributor" of the voltage of the signals that are successively transmitted through a single channel (conductor 13) among a plurality of different channels.

During this relatively slow flowing of the charge (which lasts for a substantial portion of a line scanning period), cathode 2 thus transmits, through the hole in plate 3 which corresponds to the strips *a* and *b* that are being considered, an electron flux corresponding in value to the voltage applied to electrode 13 at the time of the voltage peak in electrode $\alpha$.

The system works in the following manner: Receiver 14' successively transmits the video signals, line synchronization signals and frame synchronization signals to amplifier 14, which separates these respective signals. The video signals are sent to control through grid 13 the electron emission of cathode 12 and the synchronization signals serve to control oscillators 10 and 10'.

At the beginning of the transmission of a picture, a first video signal is received on grid 13 at the same time, oscillator 10' is giving electrode $\alpha_1$ a positive instantaneous voltage peak.

Strip $a_1$ is therefore given a positive voltage the amplitude of which corresponds to the intensity of the received video signal. All the holes of strip $a$ are thus made ready to cooperate in allowing an electron flux to flow therethrough with an intensity corresponding to the luminous intensity of the first light spot. But among strips $b$ only one is positive, to wit that corresponding to the first row. Therefore it is only through the first hole of the first row ($A_1$, $B_1$) that an electron flux passes, which electron flux strikes screen 1 at the first point or spot of the first line and produces at this point a luminous intensity corresponding exactly to the intensity of the received video signal. Shortly after this, when the second video signal is received, it is anode $a_2$ which is rendered positive and strip $a_2$ which is given a potential corresponding to the intensity of this second signal. As the first row is still the one in activity, an electron flux corresponding to the second signal is made to flow through the second hole of this first row ($A_2$, $B'_1$).

As strips $a$ keep their potential for a relatively substantial time, as above explained, the points remain illuminated for a certain time, say one half of the time of scanning of one line.

At the end of the first line, strip $a_1$ has got practically discharged through resistance 7 and is back to its normal mean potential. But when the video signal corresponding to the first point of the second line is received, the instantaneous potential of electrode $a_1$ is again made positive by oscillator 10', so that this electrode again receives from cathode 12 a certain amount of electrons (according to the potential imparted to control grid 13 by this video signal). Strip $a_1$ is therefore made active, with a potential corresponding to the intensity of this signal. But at this time oscillator 10 is giving strip $b_1$ a negative potential and strip $b_2$ a positive potential. Thus an electron flux is allowed to flow through the hole corresponding to the first point of the second line ($A'_1$, $B_2$). And so on.

Thus, the two groups of strips cooperate to control the electron fluxes from cathode 2. The electrons thus released are then accelerated and come to strike for a substantial time fluorescent screen 1 and form thereon a highly luminous image of the picture to be transmitted by television.

Figure 2:
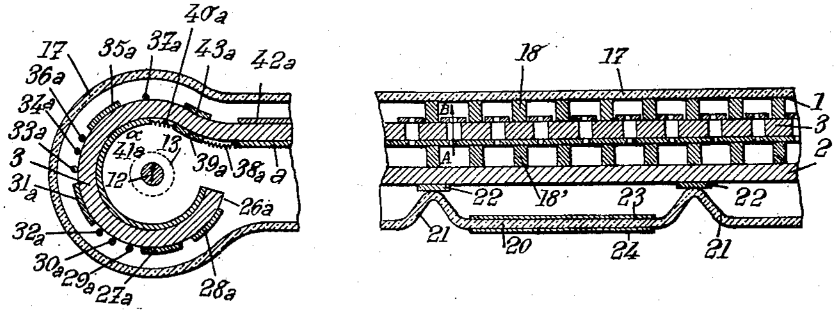
Fig. 2 is a sectional view of a portion of an image receiving tube according to my invention.

Fig. 2 is a section of a practical arrangement of the elements 1, 2 and 3 of Fig. 1.

17 is the tube front glass wall, which can be made very thin since it is no longer called upon, as in existing Braun's tubes, to resist atmospheric pressure acting thereon over a large unsupported area. The conductor fluorescent layer 1 is spread along the inner face of said wall. Then a grid 18 of an insulating material is provided along this inner face. Against this grid is applied the above described insulating sheet 3, provided with a multiplicity of holes (coinciding with those of grid 18). Another insulating grid 18' identical with grid 18 is applied against the rear face of this sheet. This grid 18' in turn bears against cathode 2, which is relatively thick and covered with materials emitting an important electron flux at low temperature. Finally, glass wall 20 is kept applied from place to place against cathode 2 through glass projections 21 and asbestos pads 22. On this rear wall 20, I provide, on the internal and external faces thereof, electrodes 23 and 24 disposed in chequered arrangement. The capacitors 23—24 thus constituted serve to transmit to the inside of the tube the alternating voltages necessary for supplying voltage distributors 4 and 4'. These capacitors were designated by 15 in Fig. 1.

Figure 3:
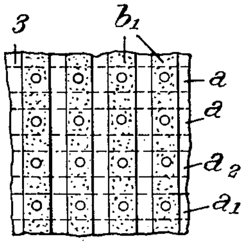
Fig. 3 is a plan view of a portion of an element of the tube of Fig. 2.
Figure 8:
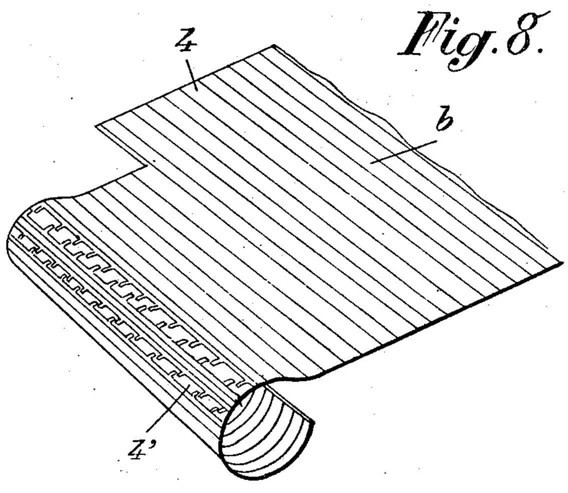

A portion of the perforated insulating plate 3 which supports straps $a$ and $b$ is shown in plan view by Fig. 3.

Figure 4:
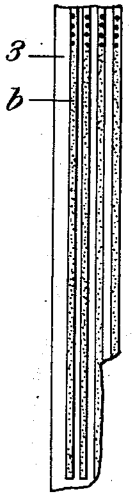
Fig. 4 is a developed view of a portion of the device of Fig. 2.
Figure 5:
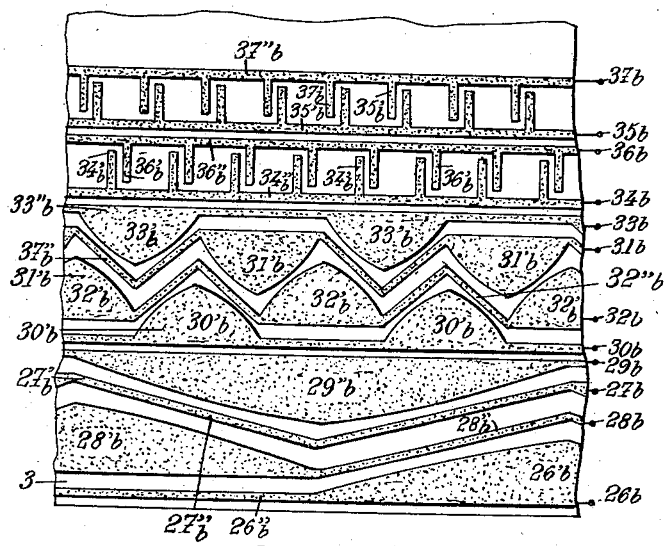
Fig. 5 is a view on an enlarged scale of an element of a voltage distributing device according to my invention.
Figures 6, 7:
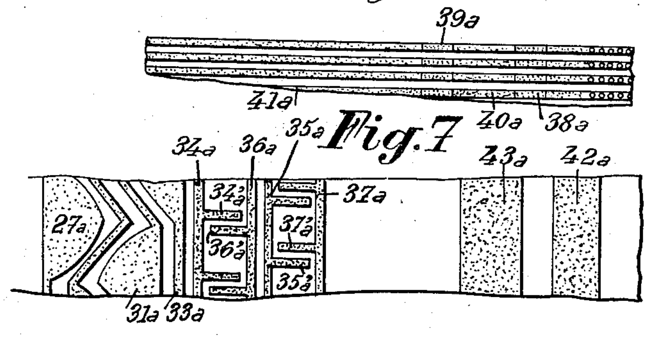
Fig. 6 is a perspective view of a portion of the structure of Fig. 4.
Fig. 7 is a detail view on a larger scale.

The voltage distributing devices 4 and 4' are constituted by rectangular extensions of insulating plate 3, in combination with conductor deposits provided on their opposite faces, as shown by Figs. 4, 5 and 6.

Fig. 4 is a developed view of plate 3, with parts cut off.

Fig. 5 is a separate view of the conductor deposits of device 4' visible on the left hand side of Fig. 4, this view being shown after a rotation of 90° in anti-clockwise direction of said portion of Fig. 4.

Fig. 6 is a perspective view of the structure inside glass envelope 16.

As shown by Figs. 4 and 5, the metallic deposits on the front face of portion 4' of sheet 3 constitute flat electrodes running in a general direction (vertical on Fig. 4) at right angles to that of strips $a$.

As shown by Fig. 6, the metallic deposits on the rear face of this portion 4' are constituted by the end portions of said strips $a$.

The example shown by the drawing corresponds to the case in which oscillator 10' supplies three four-phase currents having frequencies each of which is equal to four times the preceding one. In other words the frequencies in question are:

$$F,$$
$$F'=4F$$
$$F''=4F'=16\ F.$$

The number of strips $a$ to be fed through this voltage distributor is $4\times4\times4=64$. As above stated, the neutral point of these current distributions is earthed.

$26_a$, $27_a$, $28_a$, $29_a$ are the four terminals corresponding to the four-phase distribution of frequency F., $30_a$, $31_a$, $32_a$ and $33_a$ those corresponding to the four-phase distribution of frequency F' and $34_a$, $35_a$, $36_a$, $37_a$ those corresponding to the four-phase distribution of frequency F''.

As shown by Fig. 5, terminal $26_a$ is connected to a metal deposit $26'_a$ in the form of an isosceles triangle the two equal sides of which are curvilinear. The base of this triangle is at right angles to strips $a$. This base extends over one half of the corresponding side of part 4'. This triangular deposit therefore ranges over one half of the total number of strips $a$. The length of each strip $a$ that is covered by said electrode $26'_a$ goes gradually increasing for the first fourth of the sheet and decreasing for the second fourth. The capacity of this electrode with respect to said strips therefore varies according to the same law. Deposit $26'_a$ is prolonged by a very thin conductor strip $26''_a$ forming an extension of the base of the above mentioned triangle and having practically no capacity with respect to the strips $a$ it crosses. This conductor strip $26''_a$ ensures electrical connection of both sides of sheet 3 with terminal $26_a$.

Terminal $28_a$ is connected with an electrode $28'_a$ of the same shape and area as electrode $26'_a$ but extending along the second half of sheet 3, so that it cooperates with the strips $a$. This last mentioned electrode is connected with terminal $28_a$ through a very narrow strip $28''_a$ which has practically no capacity with respect to strips *a*. This strip $28''_a$ follows the outline of electrode $26'_a$.

The two other terminals $27_a$ and $29_a$ of this current distribution of frequency F are respectively connected with electrodes $27'_a$ and $29'_a$ similar to electrodes $26'^a$ and $28'^a$. However triangle $27'_a$ is made of two halves separate from each other and located at the respective ends of part 4', said halves being connected together by narrow strip $27''_a$. To save place, triangles $27'_a$ and $29'_a$ have their apexes in a direction opposed to that of the apexes of triangles $26'_a$ and $28'_a$.

The bases of these triangles overlap one another so that the apex of one coincides with the ends of the base of another. Thus electrode $29'_a$ covers the strips *a* numbered from 17 to 48, and electrode $27'_a$ (made of two halves) covers the strips *a* numbered from 1 to 16 and from 49 to 64.

The terminals $30_a$, $31_a$, $32_a$, $33_a$ corresponding to the distribution of current of frequency F', equal to 4F, are respectively connected with conductor deposits $30'_a$, $31'_a$, $32'_a$, $33'_a$ analogous to those above described, but constituted by four times as many triangular elements. In other words, taking for instance electrode $30'_a$, it is constituted by four isosceles triangles having their bases along a base at right angles to strips *a*, the length of each of these bases being about one fourth of the length of the base of each of the above described triangles $26'_a$, $27'_a$, $28'_a$, $29'_a$, so as to correspond to a range of about eight strips *a*. The height of these triangles $30'_a$, etc., is about the same as that of the first mentioned triangles. Deposits $30'_a$, $31'_a$, $32'_a$, $33'_a$ are similar but their bases overlap one another a distance corresponding to four strips *a*.

The next terminal, $34_a$, is connected to a multiplicity of strip portions $34'_a$ parallel to strips *a* and of substantially the same width and interconnected by a narrow conductor strip $34''_a$ parallel to strips $26''_a$, $27''_a$, etc., and having practically no capacity with respect to said strips *a*. The other terminals $35_a$, $36_a$, $37_a$ are likewise connected to small strip portions $35'_a$, $36'_a$, $37'_a$. Strips $34'_a$, $35'_a$, $36'_a$, $37'_a$ are located at a distance from one another, in a direction at right angles to strips *a*, equal to the distance between two adjacent strips *a*. With this arrangement, considering a series of strips *a* the first one has a capacity with respect to a strip $34'_a$, the second one with respect to a strip $36'_a$, the third one with respect to a strip $37'_a$, the fourth one with respect to a strip $35'_a$, the fifth one with respect to another strip $34'_a$ and so on.

Owing to this arrangement, every strip element *α* (coupled with a corresponding strip *a*) is capacitively coupled with a plurality of portions of electrodes at potentials varying with different phases and frequencies. For instance the strip *α* shown in dotted lines in Fig. 5 is capacitively subjected to the combined actions of a certain area of an electrode $28'_a$ (frequency F, phase $\varphi$) of a smaller area of an electrode $29'_a$ (frequency F, phase $$\varphi+\frac{\pi}{2})$$

of a relatively small area of an electrode $32'_a$ (frequency 4F, phase $\psi$), of a greater area of an electrode $33'_a$ (frequency 4F, phase $$\psi-\frac{\pi}{2})$$

and of the whole area of an electrode $34'_a$. The total voltage thus capacitively induced in this strip *α* has a wave form including a sharp peak occurring at periodical intervals equal to the television scanning period transmitted through 14' and 14 (since the voltage sources which constitute oscillator device 10' are synchronized to this period through 14).

The shapes of deposits $26'_a$, $27'_a$ . . . $37'_a$ are chosen not only to ensure this wave form substantially for every strip *α* but also to produce between the wave form of the voltages induced in two adjoining strips a time lag such that all the strips *α* pass successively through their respective voltage peaks inside the period of recurrence of said peak in any of the strips.

The device 4 for distributing voltages to strips *b* is the same. It is constituted by deposits formed on the under face of portion 4 of plate 3 (as shown in dotted lines by Fig. 4 and in solid lines by Fig. 6, where the portion 4 of plate 3 has been supposed to be curved in order to show these deposits), said deposits cooperating with the ends of strips *b* formed on the upper face of plate 3.

The operation of this distributing device is the same as above described for device 4'. But the voltage sources with which terminals $26_b$, $27_b$, $28_b$ . . . $37_b$ are connected are synchronized to the frame synchronizing signals through 14. The time period between two voltage peaks in each strip *b* is therefore equal to the television frame scanning period.

Concerning now the coupling of strip elements *α* with strips *a*, it is obtained through the following parts (Fig. 2), to wit, a high resistance 11, a strip portion 39 and another high resistance 9.

On the other face of portion 4' of plate 3, I provide, as shown by Figs. 2 and 4, a conductor deposit 42 extending across all strips *a*, and another deposit 43 opposite strip portions 39. Electrodes 42 and 43 are earthed. The capacitor elements formed by strips *a* with electrode 42 correspond to those designated by 8' on Fig. 1, and the capacitor elements formed by strip portions 39 with electrode 43 are those designated by 8 on Fig. 1. The front face of sheet 3 is then provided with conductor deposits $26'_a$, $27'_a$, $28'_a$ . . . $37'_a$ similar to those above described with reference to Fig. 5.

The portion 4' of sheet 3 that supports on one side strips *α* and on the other side the conductor deposits in question is wound about cathode 12 and control grid 13, as shown on the left hand side of Fig. 2. This arrangement has the advantage of reducing the space occupied by the system and ensuring a very good utilization of the electron flux supplied by cathode 12.

The conductor deposits above referred to are obtained in any suitable manner ensuring sufficient accuracy (silvering, aquadag, etc.). The thickness of these deposits may be subsequently increased by electrolysis. In order to obtain extremely thin lines, it will be advisable to employ photographic reduction methods, such as used in photo-engraving, and, for instance, to make use of a photo-sensitive varnish (Jew's pitch, fish glue, bichromated gelatin) so as to localize chemical attack to the desired places and to leave the metallic deposit intact at other places.

In the preceding description, I have supposed the tube to be a vacuum tube and the flux to be a purely electronic one. But I may obtain as good a luminosity, without having recourse to supply voltages as high as in this case, by making use of a ionized gas. For instance, the tube will be filled with a gas at low pressure, preferably a rare gas (xenon, neon, etc.). A permanent ionizing of the gas over the whole area of cathode 2 will be obtained for instance by means of auxiliary electrodes letting only a very low current to pass but capable of maintaining the discharge. The potential applied to one of the strips *b* will then be sufficient to prevent luminous discharge from taking place through all of the holes except the correct ones. The potential applied to the other strip *a* will vary as a function of the luminous intensity of the point of the picture to be reproduced the luminosity in the front chamber where is located the transparent electrode brought to a positive voltage. As this chamber is the only one visible by the spectator, the latter will see a picture constituted by a great number of elements giving the desired luminous intensity.

In the above description, the strips for local control of the electron flux have their potential controlled by a static distributor. But this distributor might be replaced by a cathode ray distributor.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A system of the type described which comprises, in combination, two sets of insulated conductor strips extending transversely to each other and located in parallel planes, means for causing the temporary flow of electric currents localized at the intersections of the respective strips of said sets transversely to the planes thereof under the effect of simultaneous given voltage peaks in the intersecting strips, two sets of electrodes each associated with one of said sets of strips at one end thereof and insulated therefrom for capacitive coupling therewith, means for feeding polyphase alternating voltages of different frequencies to the respective electrodes of each of said sets, the outlines of said electrodes being shaped so that the respective areas thereof located opposite each conductor strip capacitively induce therein a composite alternating voltage with a sharp peak occurring periodically therein, with substantially the same wave form for the respective complex voltages of each set and a uniform time lag from each to the next one such that all of said conductor strips pass successively through their respective voltage peaks inside the period of recurrence thereof, and electronic means for transmitting successive signals to all the strips of one set adjusted to be operative at any time only for the strip of said set the voltage of which is at this time passing through its peak.

2. A system of the type described which comprises, in combination, a sheet of insulating material, two sets of conductor strips extending on the opposite faces of said sheet, respectively, the strips of one set extending in a direction transverse to the direction of the strips of the other set, said sheet being provided with holes extending therethrough and through said strips at the places where the strips of the respective sets cross one another, means for producing a local electric current through each of said holes in response to the simultaneous production of given voltage peaks in the strips that cross each other on said hole, said sheet being provided with two extensions on two respective sides thereof, the strips of one set extending along one face of one of said extensions and the strips of the other set along the other face of the other of said extensions, a set of electrodes against the face of each of said extensions opposed to that carrying said strips, means for feeding a plurality of polyphase alternating voltages of different frequencies to the electrodes of each set, the outlines of said electrodes being shaped so that the respective areas thereof located opposite each conductor strip capacitively induce therein a composite alternating voltage with a sharp peak occurring periodically therein, with substantially the same wave form for the respective complex voltages of each set and a uniform time lag from each to the next one such that all of said conductor strips pass successively through their respective voltage peaks inside the period of recurrence thereof, and electronic means to transmitting successive signals for the strips of one set adjusted to be operative at any time only for the strip of said last mentioned set which is passing through its voltage peak at this time.

3. A system of the type described which comprises, in combination, a vacuum tube, a cathode in said tube, a sheet of insulating material in said tube parallel to said cathode, two sets of conductor strips extending on the opposite faces of said sheet, respectively, the strips of one set extending in a direction transverse to the direction of the strips of the other set, said sheet being provided with holes extending therethrough and through said strips at the places where the strips of the respective sets cross one another, whereby a local electron flux takes place through each of said holes in response to the simultaneous production of given voltage peaks in the strips that cross each other on said hole, said sheet being provided with two extensions on two respective sides thereof, the strips of one set extending along one face of one of said extensions and the strips of the other set along the other face of the other of said extensions, a set of electrodes against the face of each of said extensions opposed to that carrying said strips, means for feeding a plurality of polyphase alternating voltages of different frequencies to the electrodes of each set, the outlines of said electrodes being shaped so that the respective areas thereof located opposite each conductor strip capacitively induce therein a composite alternating voltage with a sharp peak occurring periodically therein, with substantially the same wave form for the respective complex voltages of each set and a uniform time lag from each to the next one such that all of said conductor strips pass successively through their respective voltage peaks inside the period of recurrence thereof, and electronic means for transmitting successive signals to the strips of one set adjusted to be operative only for the strip of said last mentioned set which is passing through its voltage peak at this time.

4. A system of the type described which comprises, in combination, a flat vacuum tube, a flat anode and a flat cathode in said tube, a sheet of insulating material in said tube parallel to said anode and said cathode and located between them, two sets of conductor strips extending on the opposite faces of said sheet, respectively, the strips of one set extending in a direction transverse to the direction of the strips of the other set, said sheet being provided with holes extending therethrough and through said strips at the places where the strips of the respective sets cross one another, whereby a local electron flux takes place through each of said holes between said anode and said cathode in response to the simultaneous production of given voltage peaks in the strips that cross each other on said hole, said sheet being provided with two extensions on two respective sides theerof, the strips of one set extending along one face of one of said extensions and the strips of the other set along the other face of the other of said extensions, a set of electrodes against the face of each of said extensions opposed to that carrying said strips, means for feeding a plurality of polyphase alternating voltages of different frequencies to the electrodes of each set, the outlines of said electrodes being shaped so that the respective areas theerof located opposite each conductor strip capacitively induce therein a composite alternating voltage with a sharp peak occuring periodically therein, with substantially the same wave form for the respective complex voltages of each set and a uniform time lag from each to the next one such that all of said conductor strips pass successively through their respective voltage peaks inside the period of recurrence thereof, an auxiliary cathode in said tube located opposite all the strips of one of said sets biased to give an electronic flux only toward that of said strips that is passing through its voltage peak, means for receiving successive electric signals, and means including a control grid connected to said signal receiving means and located between said auxiliary cathode and said last mentioned strips for modulating said last mentioned electronic flux according to the amplitudes of said signals.

5. A television screen which comprises, in combination, a flat vacuum tube, a flat cathode in said tube, a sheet of insulating material in said tube parallel to said cathode, a fluorescent anode in said tube parallel to said sheet and on the other side thereof from said cathode, two sets of conductor strips extending on the opposite faces of said sheet, respectively, the strips of one set extending in a direction transverse to the direction of the strips of the other set, said sheet being provided with holes extending therethrough and through said strips at the places where the strips of the respective sets cross one another, whereby a local electron flux takes place through each of said holes and excites said fluorescent anode in response to the simultaneous production of given voltage peaks in the strips that cross each other on said hole, said sheet being provided with two extensions on two respective sides thereof, the strips of one set extending along one face of one of said extensions and the strips of the other set along the other face of the other of said extensions, a set of electrodes against the face of each of said extensions opposed to that carrying said strips, means for feeding a plurality of polyphase alternating voltages of different frequencies to the electrodes of each set, the outlines of said electrodes being shaped so that the respective areas thereof located opposite each conductor strip capacitively induce therein a composite alternating voltage with a sharp peak occurring periodically therein, with substantially the same wave form for the respective complex voltages of each set and a uniform time lag from each to the next one such that all of said conductor strips pass successively through their respective voltage peaks inside the period of recurrence thereof, and electronic means for transmitting successive video signals to the strips of one set adjusted to be operative only for the strip of said last mentioned set which is passing through its voltage peak at this time.

6. A television screen which comprises, in combination, a flat vacuum tube, a flat cathode in said tube, a sheet of insulating material in said tube parallel to said cathode, a fluorescent anode in said tube parallel to said sheet and on the other side thereof from said cathode, two sets of conductor strips extending on the opposite faces of said sheet, respectively, the strips of one set extending in a direction transverse to the direction of the strips of the other set, said sheet being provided with holes extending therethrough and through said strips at the places where the strips of the respective sets cross one another, whereby a local electron flux takes place through each of said holes and excites said fluorescent anode in response to the simultaneous production of given voltage peaks in the strips that cross each other on said hole, said sheet being provided with two extensions on two respective sides thereof, the strips of one set extending along one face of one of said extensions and the strips of the other set along the other face of the other of said extensions, a set of electrodes against the face of each of said extensions opposed to that carrying said strips, means for feeding a plurality of polyphase alternating voltages of different frequencies to the electrodes of each set, the outlines of said electrodes being shaped so that the respective areas thereof located opposite each conductor strip capacitively induce therein a composite alternating voltage with a sharp peak occurring periodically therein, with substantially the same wave form for the respective complex voltages of each set and a uniform time lag from each to the next one such that all of said conductor strips pass succeessively through their respective voltage peaks inside the period of recurrence thereof, an auxiliary cathode in said tube located opposite all the strips of one of said sets biased to give an electronic flux only toward that of said strips that is passing through its voltage peak at this time, means for receiving video signals, and means including a control grid connected with said signal receiving means and located between said last mentioned set of strips and said auxiliary cathode for modulating the electronic flux from said last mentioned cathode according to the amplitude of said signals.

7. A system according to claim 4 in which the auxiliary cathode is parallel to said sheet and transverse to the strips of the last mentioned set, the extension of said sheet that carries said last mentioned strips being curved to surround said last mentioned cathode.

8. A system according to claim 6 in which the auxiliary cathode is parallel to said sheet and transverse to the strips of the last mentioned set, the extension of said sheet that carries said last mentioned strips being curved to surround said last mentioned cathode.

9. A system according to claim 3 including capacitors having their respective elements disposed on either face of the glass wall of said tube for transmitting the polyphase voltages to said sets of electrodes.

10. A system of the type described which comprises, in combination, a plurality of sources of polyphase alternating voltages of different frequencies, a multiplicity of conductor elements, a multiplicity of means having their inputs connected with said sources and their outputs connected with said conductor elements for respectively collecting from said sources and adding together voltages proportional to those of several of the phases of said sources so as to impress on said respective conductor elements complex varying voltages of substantially the same wave form including a periodically occurring sharp peak, with a uniform lag from every wave form to the next one, this lag being such that all of said conductor elements pass successively through their respective voltage peaks inside the period of recurrence thereof, a single means for receiving periodically transmitted groups of signals, synchronizing means between said signal receiving means and said voltage sources for keeping the period of recurrence of said voltage peaks equal to the period of transmission of said groups of signals and electronic means for transmitting the signals from said signal receiving means to said conductor elements successively as they are passing through their voltage peaks.

11. A system of the type described which comprises, in combination, a plurality of sources of polyphase alternating voltages of different frequencies, a multiplicity of conductor elements, a multiplicity of capacitive means having their inputs connected with said sources and their outputs connected with said conductor elements for respectively collecting from said sources and adding together voltages proportional to those of several of the phases of said sources so as to impress on said respective conductor elements complex varying voltages of substantially the same wave form including a periodically occurring sharp peak, with a uniform lag from every wave form to the next one, this lag being such that all of said conductor elements pass successively through their respective voltage peaks inside the period of recurrence thereof, a single means for receiving periodically transmitted groups of signals, synchronizing means between said signal receiving means and said voltage sources for keeping the period of recurrence of said voltage peaks equal to the period of transmission of said groups of signals and electronic means for transmitting the signals from said signal receiving means to said conductor elements successively as they are passing through their voltage peaks.

12. A system of the type described which comprises, in combination, a set of insulated conductor strips extending side by side in one direction in a common surface, a plurality of flat electrodes extending side by side in a general direction transverse to that of said strips in a common surface at least substantially parallel to the first mentioned surface, said electrodes being insulated from said conductor strips for capacitive coupling therewith, a plurality of sources of polyphase alternating voltage of different frequencies connected to said electrodes respectively, the outlines of said electrodes being shaped so that the areas thereof located opposite each conductor strip capacitively induce therein a complex alternating voltage with a sharp peak occurring periodically therein, with substantially the same wave form for the respective complex voltages and a uniform time lag from each to the next one such that all of said conductor strips pass successively through their respective voltage peaks inside the period of recurrence thereof, a single means for receiving periodically transmitted groups of signals, synchronizing means between said signal receiving means and said voltage sources for keeping the period of recurrence of said voltage peaks equal to the period of transmission of said group of signals and electronic means for transmitting the signals from said signal receiving means to said conductor strips successively as they are passing through their voltage peaks.

13. A voltage distributing device which comprises, in combination, a set of insulated conductor strips extending side by side in one direction in a common surface, a plurality of flat electrodes extending side by side in a general direction transverse to that of said strips in a common surface at least substantially parallel to the first mentioned surface, said electrodes being insulated from said conductor strips for capacitive coupling therewith, a plurality of sources of polyphase alternating voltages of different frequencies connected to said electrodes respectively, the outlines of said electrodes being shaped so that the areas thereof located opposite each conductor strip capacitively induce therein a complex alternating voltage with a sharp peak occurring periodically therein, with substantially the same wave form for the respective complex voltages and a uniform lag from each to the next one.

14. A television receiver device which comprises, in combination, two sets of insulated conductor strips extending transversely to each other, the conductors of each set being located side by side in a common surface and the respective surfaces of the two sets being at least substantially parallel to each other, a voltage distributing means coupled with each set for impressing on the respective strips thereof, complex varying voltages of substantially the same wave form, said wave form including a periodically occurring sharp peak, with a uniform lag from every wave form to the next one, this lag being such that all of said strips pass successively through their respective voltage peaks inside the period of recurrence thereof for said set, means for receiving television line synchronizing means and video signals, means interposed between said receiving means and one of said voltage distributing means for synchronizing said voltage distributing means to the frame synchronizing signals whereby the period of recurrence of the voltage peaks in each of the strips of the corresponding set is equal to the frame scanning period, means interposed between said receiving means and the other of said voltage distributing means for synchronizing said last mentioned voltage distributing means whereby the period of recurrence of the voltage peaks in each of the strips of the second set is the line scanning period, electronic means for transmitting the video signals from said receiving means to the strips of said second set successively as these strips pass through their voltage peaks, and means for producing, opposite the overlapping portions of two strips, one of the first set and the other of the second set, passing simultaneously through their voltage peaks, a visual signal of an intensity corresponding to that of the video signal transmitted at this time through said electronic means.

15. A television receiver device which comprises, in combination, a flat tube, a flat anode and a flat cathode, parallel to each other, in said tube, a plate of an insulating material in said tube between said anode and said cathode and parallel thereto, two sets of insulated conductor strips extending transversely to each other, the conductors of one set being located side by side on one face of said plate and the conductors of the other set side by side on the other face of said plate, said plate being provided with holes extending therethrough and through said strips where they cross one another, a voltage distributing means coupled with each set for impressing on the respective strips thereof, complex varying voltages of substantially the same wave form, said wave form including a periodically occurring sharp peak, with a uniform lag from every wave form to the next one, this lag being such that all of said strips pass successively through their respective voltage peaks inside the period of recurrence thereof for said set, means for receiving television line synchronizing means, frame synchronizing means and video signals, means interposed between said receiving means and one of said voltage distributing means for synchronizing said voltage distributing means to the frame synchronizing signals whereby the period of recurrence of the voltage peaks in each of the strips of the corresponding set is equal to the frame scanning period, means interposed between said receiving means and the other of said voltage distributing means for synchronizing said last mentioned voltage distributing means whereby the period of recurrence of the voltage peaks in each of the strips of the second set is the line scanning period, electronic means for transmitting the video signals from said receiving means to the strips of said second set successively as these strips pass through their voltage peaks, and means including said anode and said cathode for producing, opposite each hole marking the intersection of two strips, one of the first set and the other of the second set, passing simultaneously through their voltage peaks, a visual signal of an intensity corresponding to that of the video signal transmitted at this time through said electronic means.

16. A television receiver according to claim 15 in which said tube is a vacuum tube, the last mentioned means including a fluorescent layer on said anode and bias means for preventing electronic flow between said anode and said cathode under normal conditions and permitting said flow only across two strips, of the two sets respectively, passing through their voltage peaks.

17. A television receiver according to claim 16 in which said tube is a gas filled tube, the last mentioned means including means for producing permanent ionization only between the cathode and the flat plate and permitting the luminous discharge to extend beyond said plate only where two intersecting strips, of the two sets respectively, are passing through their voltage peaks.

PIERRE MARIE GABRIEL TOULON.

REFERENCES CITED

The following references are of record in the file of this patent:

UNITED STATES PATENTS

| Number | Name | Date |
|---|---|---|
| 2,201,066 | Toulon | May 14, 1940 |
| 2,471,253 | Toulon | May 24, 1949 |

FOREIGN PATENTS

| Number | Country | Date |
|---|---|---|
| 50,433 | France (Addition to No. 840,915) | June 5, 1940 |
| 506,877 | Great Britain | June 6, 1939 |
| 601,188 | France | Feb. 24, 1926 |
| 819,199 | France | Oct. 12, 1937 |